V. LOPARDO.
TIRE.
APPLICATION FILED OCT. 18, 1919.

1,435,718. Patented Nov. 14, 1922.

Witnesses
Benj. Kahn

Inventor
Vincent Lopardo
By Victor J. Evans
Attorney

Patented Nov. 14, 1922.

1,435,718

UNITED STATES PATENT OFFICE.

VINCENT LOPARDO, OF SPRINGFIELD, MASSACHUSETTS.

TIRE.

Application filed October 18, 1919. Serial No. 331,658.

*To all whom it may concern:*

Be it known that I, VINCENT LOPARDO, residing at Springfield, in the county of Hampden and State of Massachusetts, have invented new and useful Improvements in Tires, of which the following is a specification.

This invention relates to vehicle tires, particularly to that type including ordinarily a casing and an inner tube, and has for its object the provision of a cushion filler adapted to take the place of the well known inflatable tube, this filler being formed of a plurality of arcuate rubber blocks adapted for disposition within a casing, the meeting ends of the blocks being recessed whereby to provide pockets therebetween when the sections are assembled and the blocks being also provided at their inner or rim engaging faces with other recesses also defining air pockets, the various air pockets providing resilience so as to insure easy riding of the vehicle equipped with the tires.

An important object is the provision of a structure of this character which will be simple and inexpensive and which will be superior to the inflatable tube inasmuch as punctures and blow-outs will be eliminated.

With the above and other objects and advantages in view, the invention consists in the details of construction to be hereinafter more fully described and claimed, and illustrated in the accompanying drawings in which—

Figure 1:
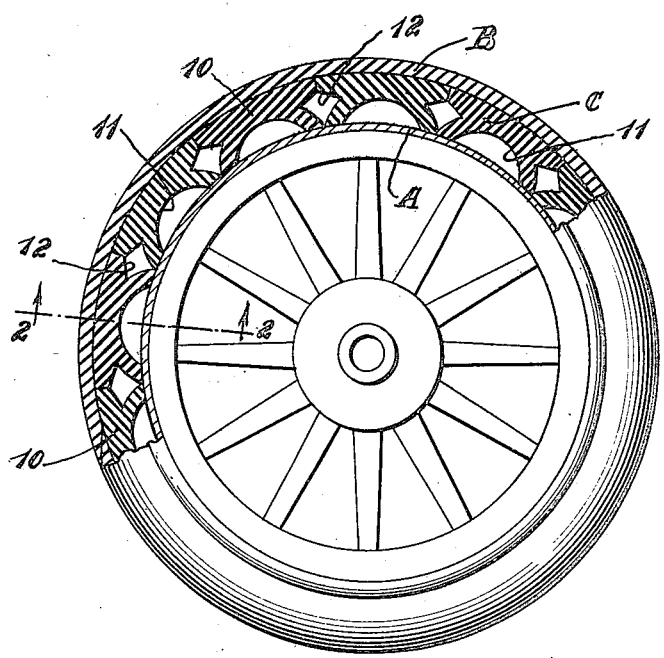
Figure 2:
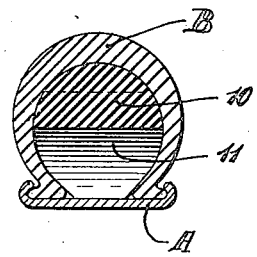

Figure 1 is a longitudinal sectional view through a tire, showing my device in position, and Figure 2 is a cross sectional view taken on the line 2—2 of Figure 1.

Referring more particularly to the drawings, the letter A designates the rim of a vehicle wheel, B designates an outer casing of ordinary form, and C designates my filler. In carrying out my invention I provide a plurality of arcuate blocks 10 which when placed together in end to end relation will form a ring-like body designed to take the place of the inflatable inner tube commonly used in vehicle tires. These blocks may be formed entirely of rubber or of rubberized fabric such as is used in casing construction and the blocks may or may not be cemented together at their ends. Each block is provided transversely of its rim engaging face with a substantially semi-cylindrical recess 11 which when the block engages the rim constitutes the air pocket. Each end of each block is also provided with an annular recess 12 extending across the end and when the blocks are arranged in end to end relation these recesses 12 form air pockets, as will be readily understood.

In the use of the device the blocks may be inserted within the casing separately and moved into abutting engagement or they may be first secured together by cementing or by vulcanizing and then subsequently be disposed within the casing. In some instances, in case the use of a casing is not desired, the blocks may be vulcanized together and the device be suitably secured upon the rim for taking the place of the ordinary tire construction.

From the foregoing description and a study of the drawings it will be apparent that I have thus provided an extremely simple and inexpensive tire construction which will be puncture and blow-out proof, which will consequently be highly efficient and satisfactory in use and durable in service while not sacrificing the proper degree of resilience to insure easy riding qualities.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

A vehicle tire consisting of a shoe, and a series of load sustaining resilient blocks disposed in the shoe to form a continuous ring, each block having a longitudinal arch at its inner side and a recess in each end, the blocks being disposed in contacting relation to each other so that the recesses in the confronting ends of the blocks will register and the confronting terminal portions of the arches will abut against each other.

In testimony whereof I affix my signature.

VINCENT LOPARDO.